(12) United States Patent
Fisher et al.

(10) Patent No.: US 6,752,184 B1
(45) Date of Patent: Jun. 22, 2004

(54) MILLING TOOL FOR MACHINING WOOD, WOODEN MATERIALS, SYNTHETIC MATERIALS OR THE LIKE

(75) Inventors: Roland Fisher, Dresden (DE); Michael Oertel, Neuaergeriss (DE); Klaus Rehm, Dresden (DE)

(73) Assignee: Technische Universitaet Dresden, Dresden (DE)

( * ) Notice: Subject to any disclaimer, the term of this patent is extended or adjusted under 35 U.S.C. 154(b) by 0 days.

(21) Appl. No.: 09/913,759

(22) PCT Filed: Feb. 18, 2000

(86) PCT No.: PCT/DE00/00453

§ 371 (c)(1),
(2), (4) Date: Nov. 19, 2001

(87) PCT Pub. No.: WO00/48802

PCT Pub. Date: Aug. 24, 2000

(30) Foreign Application Priority Data

Feb. 19, 1999 (DE) .......................................... 199 07 230
Jun. 3, 1999 (DE) .......................................... 199 25 478
Oct. 19, 1999 (DE) .......................................... 199 50 722

(51) Int. Cl.[7] .............................................. B27C 5/00
(52) U.S. Cl. ...................... 144/176; 144/218; 144/235; 407/34; 407/48
(58) Field of Search ................................ 144/172, 173, 144/174, 176, 218, 220, 221

(56) References Cited

U.S. PATENT DOCUMENTS 3,616,507 A * 11/1971 Wirfelt .......................... 407/40
4,645,383 A * 2/1987 Lindsay ........................ 407/36
4,993,890 A * 2/1991 Tukala et al. .................. 407/34

FOREIGN PATENT DOCUMENTS

| DE | 301957 | 8/1976 |
|---|---|---|
| DE | 30 43 146 | 7/1982 |
| DE | 31 20 343 | 12/1982 |
| DE | 195 09 933 | 5/1996 |
| EP | 0 367 255 | 5/1990 |

* cited by examiner

Primary Examiner—Allen Ostrager
Assistant Examiner—Shelley Self
(74) Attorney, Agent, or Firm—Jordan and Hamburg LLP

(57) ABSTRACT

A milling tool for machining wood, synthetic materials or the like, has at least one cutting edge disposed on the milling tool, a chip chamber for receiving chips disposed directly in front of the cutting edge in a direction of rotation or a gap that is connected to a tool cavity inside the tool and that in turn has an axial ejection slot for evacuating the chips. The chip chamber or the gap form an opening for the evacuation of chips, the opening extends approximately perpendicular to a cutting plane formed by the cutting edge and the direction of cutting, wherein the opening has a cross section that is bigger than a projected surface of a chip that is separated by the cutting edge during a cutting operation.

13 Claims, 5 Drawing Sheets

MILLING TOOL FOR MACHINING WOOD, WOODEN MATERIALS, SYNTHETIC MATERIALS OR THE LIKE

BACKGROUND

The invention relates to a milling tool for machining wood, wooden materials, plastics or the like with at least one cutting edge arranged in the milling tool and a chip space or gap located in front of the cutting edge for chip collection and has an axial ejection opening for chip disposal which runs approximately perpendicular to a plane formed by the cutting edge and cutting direction and has a cross-section bigger than the projected area of a chip cut off during the cutting action of the cutting edge.

From DE 30 43 146 A1, a milling tool is known which has cutting edges arranged on a perimeter of the tool. During generation of cut-off chips, the chips are pushed into chip spaces located in front of the cutting edges where they remain until an end of each single cutting-off process is reached. As soon as the cutting edge leaves a workpiece surface the chips are transported due to the centrifugal force out of the chip spaces and then have to be removed from a work area and its environment by means of an accompanying exhaust system.

It is a disadvantage of this milling tool that the chips discharged possess a high level of kinetic energy and have to be caught and transported away using complicated chip hoods and high suction air rates, which produces high costs. With increasing cutting speed and rate of revolutions, the exhaust speed and air rate required to collect and transport away the chips and to observe regulations on the residual dust content of the air also increase.

Not all generated chips are collected by the exhaust system and can accumulate at the workpiece surface. This can lead to the known indentation traces of adhering chips generated by transport rolls or during restacking operations. Cut-off chips can also reach a subsequent point of chip removal and be chipped for another time, which also produces traces on the surface of the workpiece. In addition to these adverse effects on the surface of the workpiece, higher wear rates of the cutting edge result due to multiple chipping, particularly during machining of wood or wooden materials.

From DE 31 20 343 A1 a circular sawing device is known in which in saw blade exhaust channels have interiors that are provided open to a saw blade perimeter and directed approximately radially to a central zone leading to a collection space which is provided at a rack and connected to an exhaust system.

From DE 195 09 933 CI a milling tool for machining wood, plastics or the like is known with at least two cutting edges staggered on a perimeter with a leading pressing element that rises above a circumferential surface of a tool shaft and a lagging cutting edge that rises above the pressing element, with a gap between the cutting edge and the pressing element. From this document the connection of this gap with a cavity in the interior of the tool shaft is known, whereby the cavity has openings for chip disposal. The narrow gap combined with the pressing element is intended to minimize pre-chopping during wood machining. In this solution the setting of the gap between the cutting edge and the pressing element defines the cutting conditions. Additionally it is proposed to support chip disposal by an air current which is led longitudinally through the tool shaft.

From EP 0 367 255 A2 a wood machining machine for the production of flat chips is known that uses a powered, horizontally arranged cutting rotor with cutting knives, in which, in order to remove the chips in approximately axial direction, a stationary guide plate protrudes into an inner machining space, whereby the guide plate has a blade-like curvature, is positioned in a lower zone of the rotor and extends approximately over the full radial height of the inner machining space.

From DE 301 957 C a bell-shaped milling cutter for wood which is equipped with protective devices between the knife edges is known. A protective ring rests on a rim of the knives and protective elements to prevent springing. In an advantageous embodiment, the knife parts can be rotationally adjusted in relation to the protective ring by means of set screws, set wedges or the like. The chip slots in front of the cutting edges are equivalent in their geometry and function to the chip collection spaces of conventional tools and thus do not serve to remove the chips into the tool inner space.

SUMMARY

It is the objective of this invention to provide, for milling tools with chip space or gap, a device for disposal of chips that requires little energetic and technical effort, prevents adverse effects on a generated workpiece surface and reduces wear of cutting edges.

According to the invention, the problem is solved by designing a chip space or gap as an opening for chip disposal with the opening running approximately perpendicular to a plane formed by a cutting edge and cutting direction, and having a cross-section bigger than a projected area of a chip cut off during the cutting action of the cutting edge.

In contrast to DE 195 09 933 C1, in this invention the opening is significantly bigger than a gap of DE 195 09 933 CI where it is regarded as technologically necessary to provide a very narrow gap (the principle of a plane's mouth) combined with a pressing element for the improvement of the surface quality (minimization of pre-chopping).

Also in DE 31 20 343 A1, an only very small chip opening can be used due to the design so that the chips have to be forced together or fragmentized, respectively, so that they can pass then into the tool, or to the collection space, respectively, supported by an exhaust system.

The big cross-section of the opening for chip disposal of the present invention makes it possible that through it solid wood chips of a big cross-sectional area can unimpededly get into the tool, even if they are curled. The outwardly flowing air (centrifugal pump effect) only marginally impedes the chips in moving inwardly. Therefore the opening does not clog as quickly as a small gap.

In DE 195 09 933 C1 and DE 31 20 343 A1, a plan angle K of 90° is used for technical reasons. Due to the design the chips move radially into the tool. In order to make the chips leave the tool, the direction of motion of the chips has to be changed with help of auxiliary energy (suction or compressed air, respectively).

In the first embodiment of the present invention the chips, axially accelerated during the cut-off process, move due to their high level of kinetic energy automatically along the cutting edge and the clapper over the opening for chip disposal in direction of the ejection opening, or the front face, respectively, without any energy separately supplied. Cutting is carried out using geometrically defined, straight or profiled cutting edges.

Equivalent to the front side ejection opening at the tool cavity, it is also possible to have the gap run through to the front face. Therefore no big tool cavity is necessary, which is advantageous, particularly, for tools of small diameters and/or high strength requirements.

It is advantageous to arrange the cutting edge with a plan angle K of between 60° and 20°. In an advantageous embodiment, the front side ejection opening can also be designed conical.

The opening for chip disposal can be designed as an opening with a constant cross-section or with a cross-section widening in the direction of the front face. The cross-sections are designed as slots, or holes, respectively, requiring little technological effort.

The ejection opening and the tool perimeter are advantageously bevelled in accordance with the plan angle. Walls of the hollow tool body are set as thin as possible. This minimizes a path length of the chips into, or through the tool, respectively.

In order to prevent widening of the body, or cutting edge carrier, respectively, equipped with openings, at higher rotational speeds, it is advantageous to provide a clamping ring for improving the tool's strength at the open side.

The front face of the milling tool is advantageously designed (as a tubular connection) to adapt a chip disposal device. The chip disposal device can be dimensioned to demand little power only for the transport of the cut-off wood chips from the tool to the chip bin.

Clamping of the cutting edges is designed to enable an unimpeded chip transport into the tool, or gap, respectively. Therefore, the cutting edge is attached to the tool body either permanently by brazing, bonding or the like, or replaceably with a clapper.

In a second embodiment of the present invention, in case of a plan angle K greater than 60°/70°, in an existing tool cavity in an interior of the milling tool a stationary thin-walled cylindrical to conical built-in component matched to a shape of the tool's inner space is provided whose outer diameter is slightly smaller than that of the tool cavity, with at least one chip window in a region of the opening for chip disposal (region of action), which is dimensioned such that the chips can unimpededly enter into the remaining tool cavity.

In this embodiment the milling tool includes a rotating thin-walled tool body with at least two cutting edges staggered at a periphery and a gap in front of the cutting edges. Cutting is carried out with geometrically defined straight, or profiled, respectively, cutting edges. The chips are accelerated when being cut off from the workpiece by the cutting edge, and move in a direction of the tool cavity through the chip collection opening. In such a rotating tool body, air flows out of the gap (similar to the principle of the radial-flow centrifugal pump) against the chip motion and thus prevents, above all, the big solid wood chips from being transported further. The centrifugal force pushes them outwardly, or against the inner wall of the tool, respectively.

Due to the stationary cylindrical to conical built-in component with a chip window, the air volume in the tool cavity is prevented from being carried off so that it escapes no longer through the chip collection openings driven by the centrifugal force, thereby no longer impeding the movement of the chips into the interior of the tool or even pressing them out.

Hence the chips fly freely through the chip window and hit an advantageously inclined guide plate, which leads them axially out of the tool.

There are several alternatives for the chips to leave the tool. One of these is a gap between tool and motor/bearing plate. In this case, the cylindrical to conical built-in component is on feet or has an outlet opening in direction of the flight of the chips in the lower region of the built-in component. Another alternative is that the tool is designed open at a side opposite to the motor. In this case, the built-in component has to be fixed to the motor or frame through braces.

A supporting, axially operating exhaust system can be attached to the tool directly at the ejection opening. It is advantageous that this exhaust system can be operated with a small power just sufficient to transport the chips from the tool to the chip bin.

In order to prevent widening of the slotted bodies at higher rotational speeds, clamping rings can be provided at the open side of the tool.

The advantage of the present invention is that the chips move into the tool without any auxiliary energy needed and are transported off automatically.

BRIEF DESCRIPTION OF THE DRAWINGS

The invention is further explained in the drawing by examples of embodiment represented schematically. In the drawings there is shown by.

DETAILED DESCRIPTION

Figure 1:
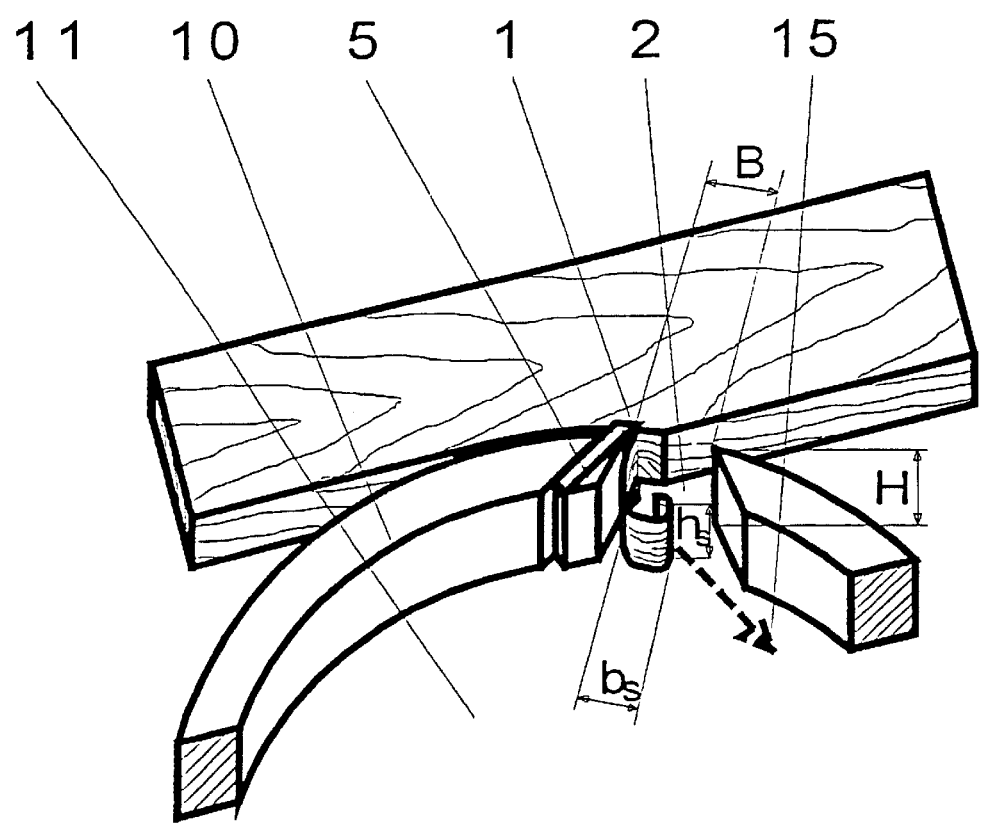
FIG. 1, a representation to show the operating principle.

FIG. 1 shows an operating principle wherein a chip is cut off from a workpiece by means of a cutting edge 1. During this process it moves over the cutting edge 1 and a clamp 5 through an opening 2 for chip disposal into a tool cavity 11. The chip is compressed at the cutting edge 1 and hence curls a little. To ensure that the chip enters the tool cavity 11 unimpededly a cross-section (B×H) of the opening 2 for chip disposal is dimensioned bigger than the projected area (bs×hs) of the chip cut off with the cutting edge 1. During the cut-off operation the chip is given an acceleration/a momentum and moves on a chip trajectory 15 through the tool cavity 11.

Figure 2:
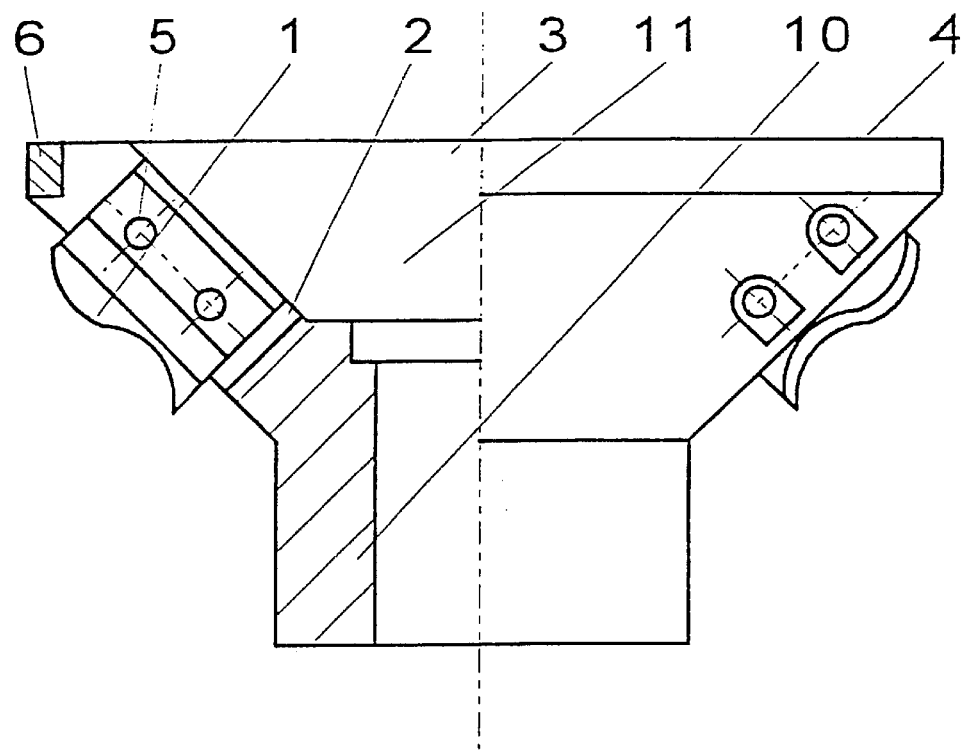
FIG. 2, a milling tool with a conical ejection opening and profiled knives.

In FIG. 2 a milling tool with a conical ejection opening 3 (conical tool cavity) is shown. Two cutting edges 1 are arranged at a plan angle K of 45° relative a radial plane of the milling tool and opposite to each other at the milling tool. In front of each cutting edge 1 there is an opening 2 for chip disposal which is open to the ejection opening 3. The opening 2 runs conically in direction of the ejection opening 3 and is designed as a slot in a front face 4. In the opening 2 a profiled cutting edge 1 is arranged by means of a clamp 5 (clapper) so that the chosen free cross-section of the opening 2 is not restricted. Furthermore, a clamping ring 6 enclosing the front face 4 is provided that reaches over the slotted opening 2 contributing to the improvement of the strength of this thin-walled milling tool. The clamping ring 6 is designed so that it can be shrunk fit on the milling tool.

In the milling tool of FIG. 2 the chips which are cut off and accelerated with the cutting edge 1 are led to the ejection opening 3 through the opening 2 in front of the cutting edge 1. An opposite tool front face is closed and serves to support a drive shaft. The chips leave the tool automatically. An exhaust device with a low power demand can be arranged at the ejection opening 3 to transport the chips over a greater distance to a chip bin.

Figure 3:
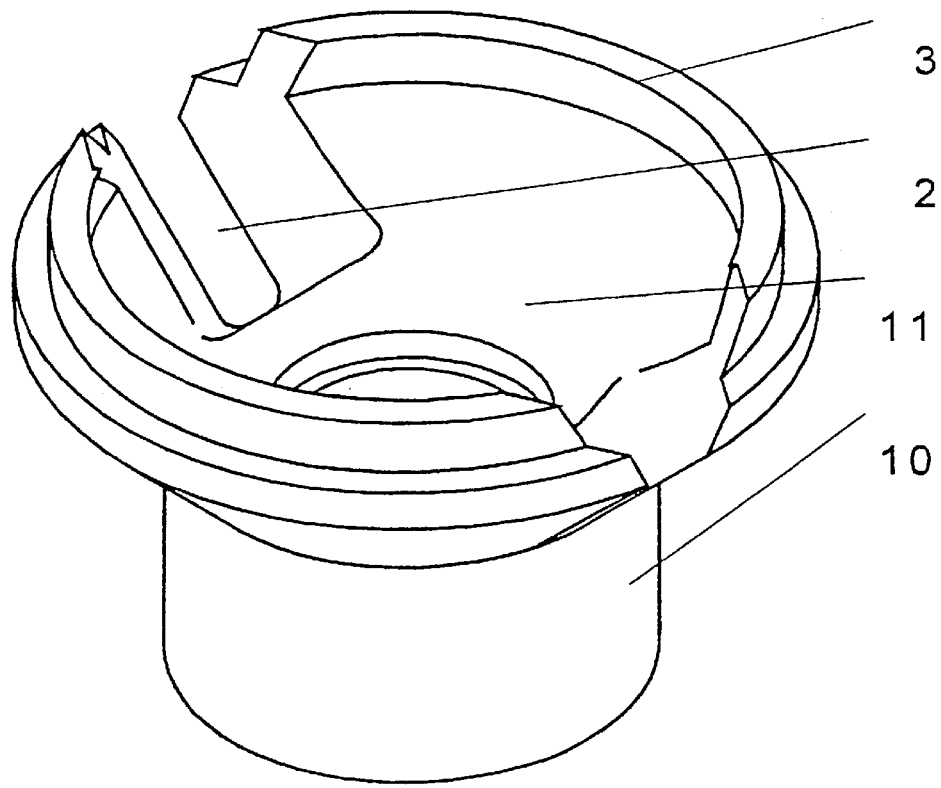
FIG. 3, a perspective view of the tool body to FIG. 2.

FIG. 3 shows in perspective a milling tool according to the representation in FIG. 2. In FIG. 3, only the rotationally symmetric body is shown without the built-on parts cutting edge 1 with clamp 5 and clamping ring 6. The design of the opening 2 and ejection opening 3 are clearly seen.

Figure 4:
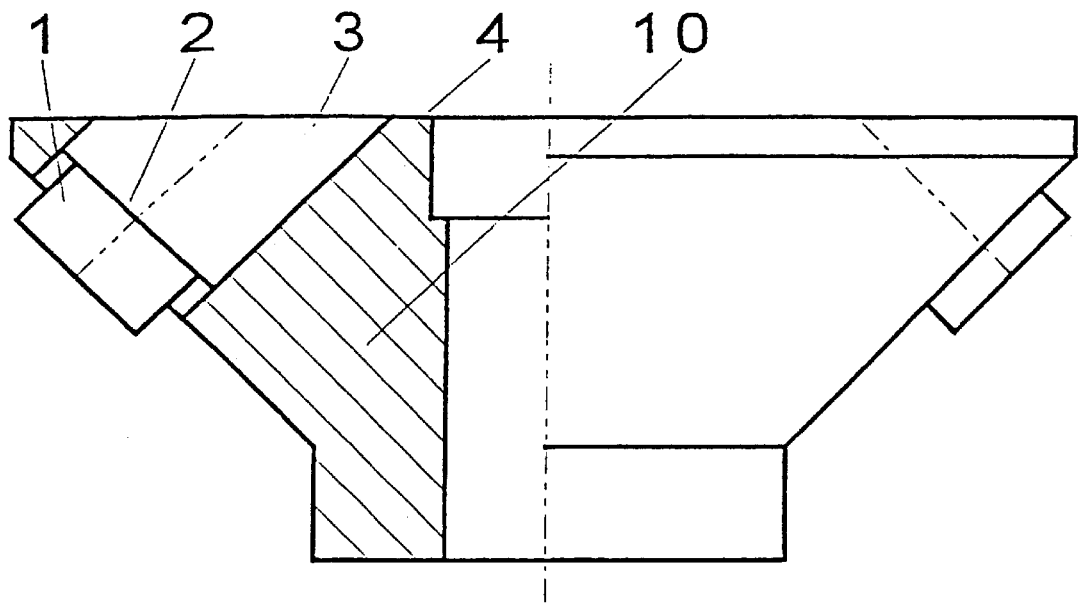
FIG. 4, a milling tool with chip throughputs to the front face.

In FIG. 4 a milling cutter is shown that is equivalent to the representation in FIGS. 2 and 3 as far as the plan angle is concerned. Instead of a conical ejection opening, here the opening 2 runs up to the front face 4 of the tool. The opening 2 has a cross-section constantly circular over its length, whose axis is perpendicular to a plane formed by the cutting edge and cutting direction.

Figure 5:
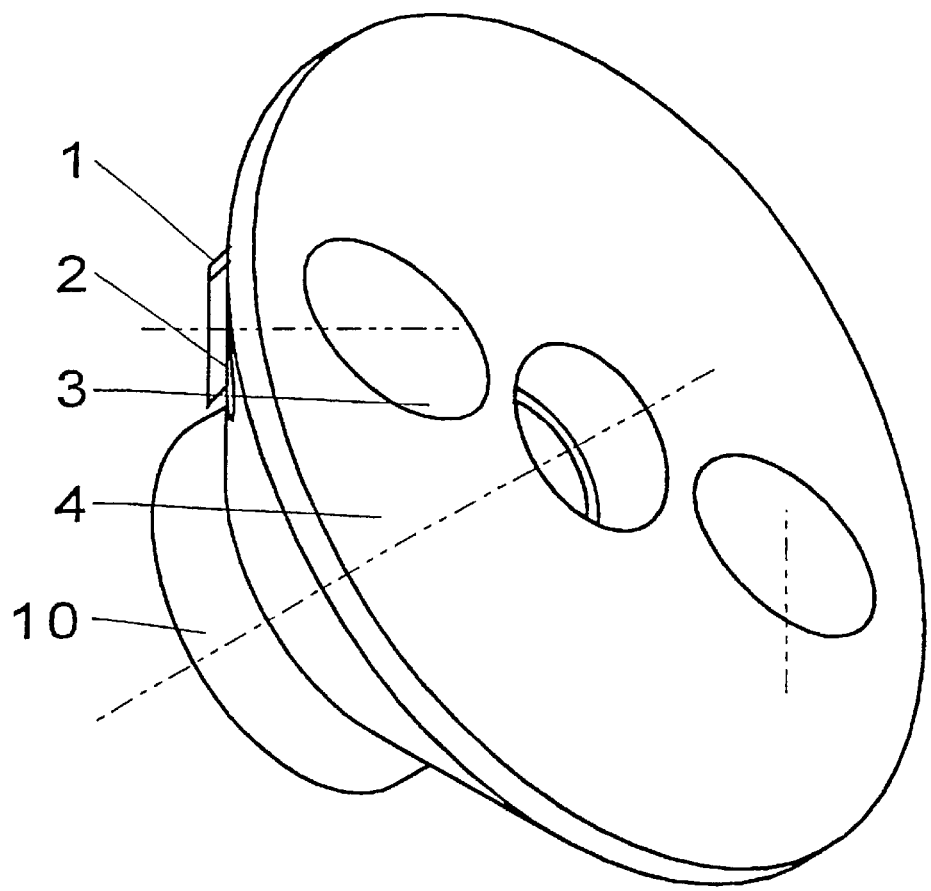
FIG. 5, a perspective view of the tool body to FIG. 4.

FIG. 5 shows the milling tool of FIG. 4 in perspective. In FIG. 5 the position of the openings 2 at the front face 4 of the milling tool is shown. In the centre of the front face 4, there is a hole for a drive shaft.

The cutting edge 1 is arranged at an angle in front of the circular opening 2. Here the cutting edge 1 is fastened by brazing or bonding.

Figure 6:
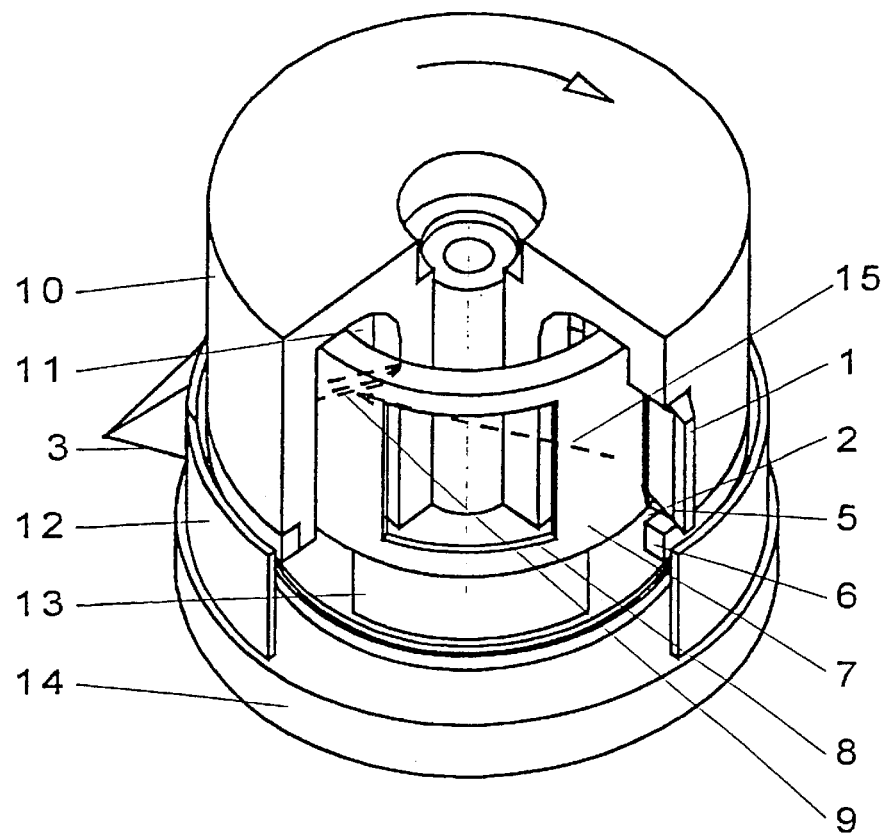
FIG. 6, a perspective view of the embodiment with chip ejection between tool and motor/bearing plate with the tool body sectioned.

In FIG. 6 a perspective view of an embodiment with a chip ejection between the tool and the motor/bearing plate is shown with a sectional view of the tool body 10. The milling tool of FIG. 6 pushes the chips cut-off by the cutting edge 1 through an opening 2 in front of the cutting edge 1 and a chip window 8, which is arranged behind it (with reference to a chip trajectory 15) within a zone of action, of a stationary cylindrical to conical built-in component 7 in a tool cavity 11. In the tool design of FIG. 6 the built-in component 7 is made cylindrical, or tubular, respectively, to obtain a good adaptation to an inner shape of the tool and a remaining tool cavity 11. The chips are thrown onto a guide plate 9 at an inner wall of the tubular built-in component 7, which guide plate 9 leads the chips approximately axially out of the tool cavity 11 through the gap between the tubular built-in component 7 and the motor/bearing plate 14, with the gap created by installing the tubular built-in component 7 on several feet 13, and the gap between the tool body 10/clamping ring 6 and motor/bearing plate 14 to the ejection opening 3.

Figure 7:
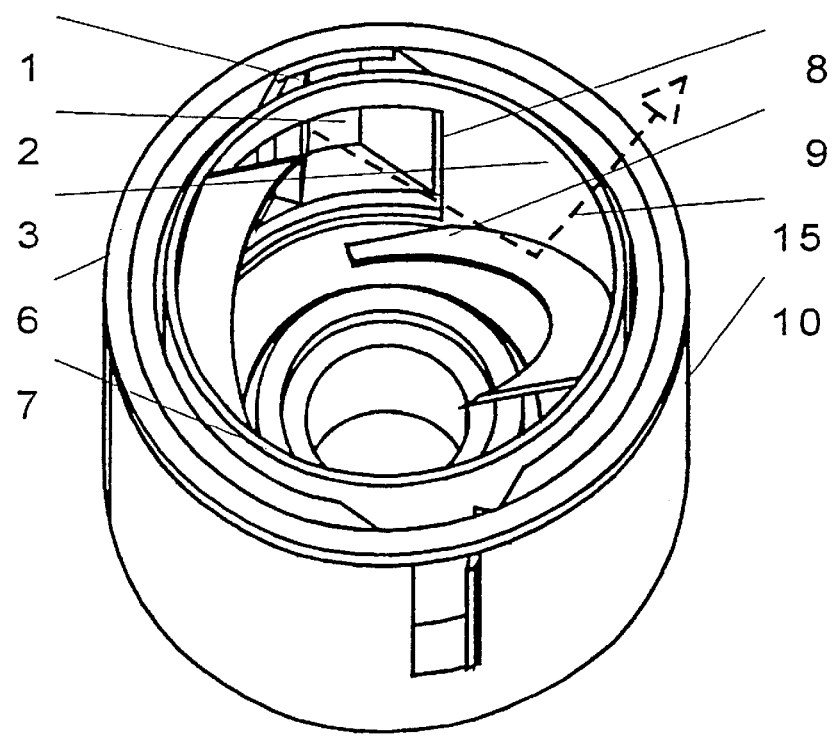
FIG. 7, a perspective view of the embodiment with chip ejection to the open side of the tool opposite to the motor with the tool body sectioned.

FIG. 7 shows in perspective the milling tool with the ejection opening 3 situated at a side opposite to the motor above the tool body 10 and clamping ring 6. Directly to the ejection opening 3, an exhaust hose can be connected to transport the chips away. The tubular built-in component 7 is stationarily fastened via a lever mechanism 17 (FIG. 8) or feet 13 (not shown here).

Figure 8:
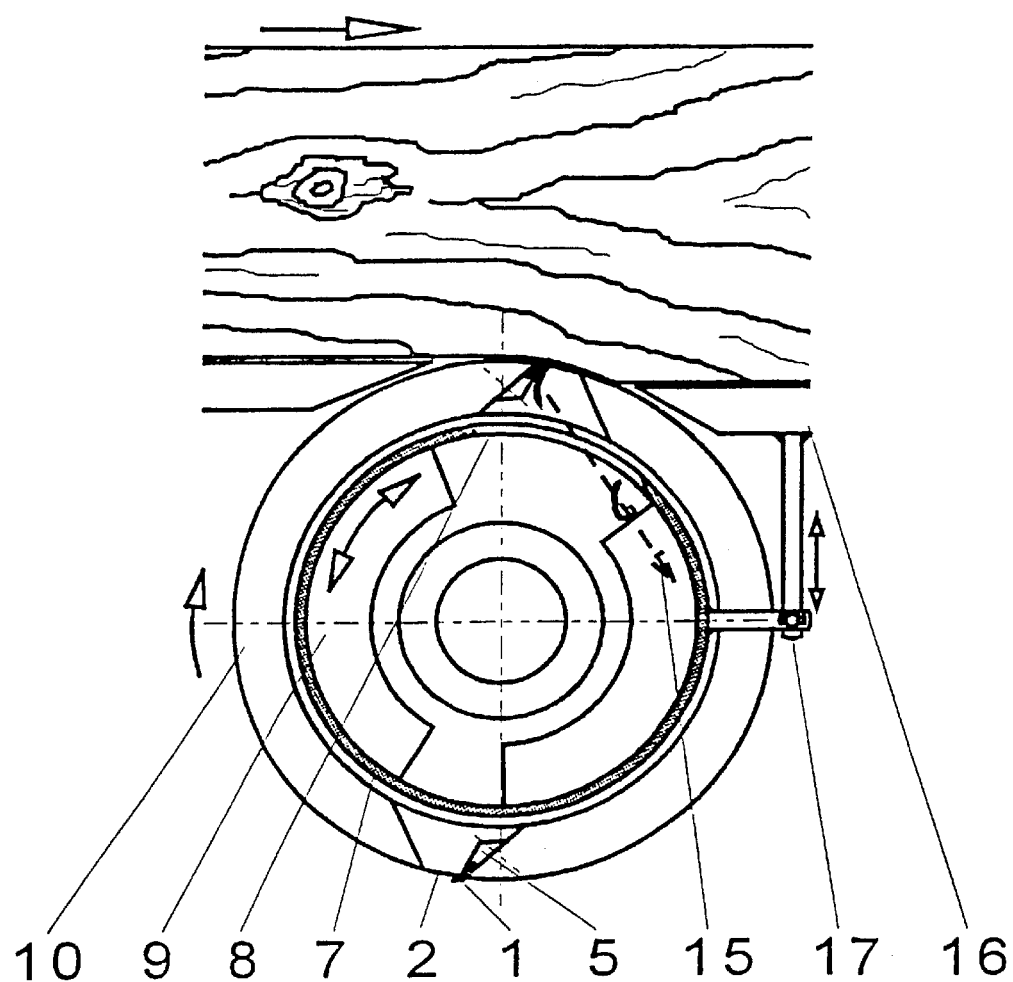
FIG. 8, a cross-sectional view through the milling culter to FIG. 7.

In FIG. 8 the cross-sectional view of the milling cutter of FIG. 7 is shown. The chip window 8 is arranged such that it covers the region of action. In case of big changes of the depth of cut, it is necessary to reposition the chip window 8.

Positioning of the chip window 8 relative to the region of action is carried out through a lever mechanism 17, which is connected to a settable stop/table 16.

The edge of the chip window 8 located in direction of the flight of the chips is beveled to impede the chip motion as little as possible.

What is claimed is:

1. A milling tool, comprising:
   a milling tool body defining a tool cavity at an interior thereof, the tool cavity defining an axial ejection opening for ejecting chips;
   at least one cutting edge arranged on the milling tool body; and
   the milling tool body defining a chip receiving opening located in front of the cutting edge for chip collection communicating with the tool cavity, the chip receiving opening extending approximately perpendicular to a plane formed by the cutting edge and cutting direction and the chip receiving opening having a cross-section bigger than a projected area through which a chip travels after being cut off during cutting action of the cutting edge.

2. The milling tool according to claim 1 wherein the cutting edge is arranged at a plan angle relative a radial plane of the milling tool between 90° and 0°.

3. The milling tool according to claim 2 wherein the axial ejection opening is conical.

4. The milling tool according to claim 1 wherein the chip receiving opening is designed with a constant cross-section as a cylindrical hole or as a slot.

5. The milling tool according to claim 1 wherein the chip receiving opening is designed with a widening cross-section as a hole or as a slot.

6. A milling tool, comprising:
   a milling tool body defining a tool cavity at an interior thereof, the tool cavity defining an axial ejection opening for ejecting chips;
   at least one cutting edge arranged on the milling tool body; and
   the milling tool body defining a chip receiving opening located in front of the cutting edge for chip collection communicating with the tool cavity, the chip receiving opening extending approximately perpendicular to a plane formed by the cutting edge and cutting direction and the chip receiving opening having a cross-section bigger than a projected area through which a chip travels after being cut off during cutting action of the cutting edge,
   wherein for unimpeded disposal of the chips the cutting edge is inserted into the milling tool body using a clamp that does not reduce the cross-section of the chip receiving opening.

7. A milling tool, comprising:
   a milling tool body defining a tool cavity at an interior thereof, the tool cavity defining an axial ejection opening for ejecting chips;
   at least one cutting edge arranged on the milling tool body; and
   the milling tool body defining a chip receiving opening located in front of the cutting edge for chip collection communicating with the tool cavity, the chip receiving opening extending approximately perpendicular to a plane formed by the cutting edge and cutting direction and the chip receiving opening having a cross-section bigger than a projected area through which a chip travels after being cut off during cutting action of the cutting edge, wherein in the tool cavity a stationary thin walled cylindrical to conical built-in component matched to a shape of the tool cavity is provided whose outer diameter is slightly smaller than that of the tool cavity, whereby the built-in component has in a region of the chip receiving opening at least one chip window, which is dimensioned such that the chips unimpededly enter into an area of the tool cavity within the built-in component.

8. The milling tool according to claim 7 wherein at an inner wall of the built-in component at least one guide plate is provided for deflecting the chips, which runs from the chip window to the axial ejection opening, beginning, in direction of a chip trajectory, above a side edge of the chip window and being inclined over the whole width of the built-in component downwards in direction of the axial ejection opening.

9. The milling tool according to claim 7 or 8 wherein the chip window can be adjusted to the region of the chip receiving opening.

10. The milling tool according to claim 9 wherein the positioning of the chip window to the region of the chip receiving opening is carried out either manually over elongated holes, or hole matrix, respectively, at the attachment of the built-in component or mechanically over a lever mechanism connected to an adjustable stop/table.

11. The milling tool according to claim 10 wherein the side edge of the chip window that is situated in the direction of the flight of the chips is beveled.

12. A milling tool, comprising:
a milling tool body defining a tool cavity at an interior thereof, the tool cavity defining an axial ejection opening for ejecting chips;
at least one cutting edge arranged on the milling tool body; and
the milling tool body defining a chip receiving opening located in front of the cutting edge for chip collection communicating with the tool cavity, the chip receiving opening extending approximately perpendicular to a plane formed by the cutting edge and cutting direction and the chip receiving opening having a cross-section bigger than a projected area through which a chip travels after being cut off during cutting action of the cutting edge, wherein a clamping ring enclosing a front face of the milling tool body is provided to increase stiffness.

13. A milling tool, comprising:
a milling tool body defining a tool cavity at an interior thereof, the tool cavity defining an axial ejection opening for ejecting chips;
at least one cutting edge arranged on the milling tool body; and
the milling tool body defining a chip receiving opening located in front of the cutting edge for chip collection communicating with the tool cavity, the chip receiving opening extending approximately perpendicular to a plane formed by the cutting edge and cutting direction and the chip receiving opening having a cross-section bigger than a projected area through which a chip travels after being cut off during cutting action of the cutting edge, wherein the cutting edge is arranged at the plan angle between 70° and 20° relative to a radial plane of the milling tool.

* * * * *